May 19, 1970  G. S. ERIKSSON  3,512,328
FASTENING DEVICE
Filed July 5, 1968
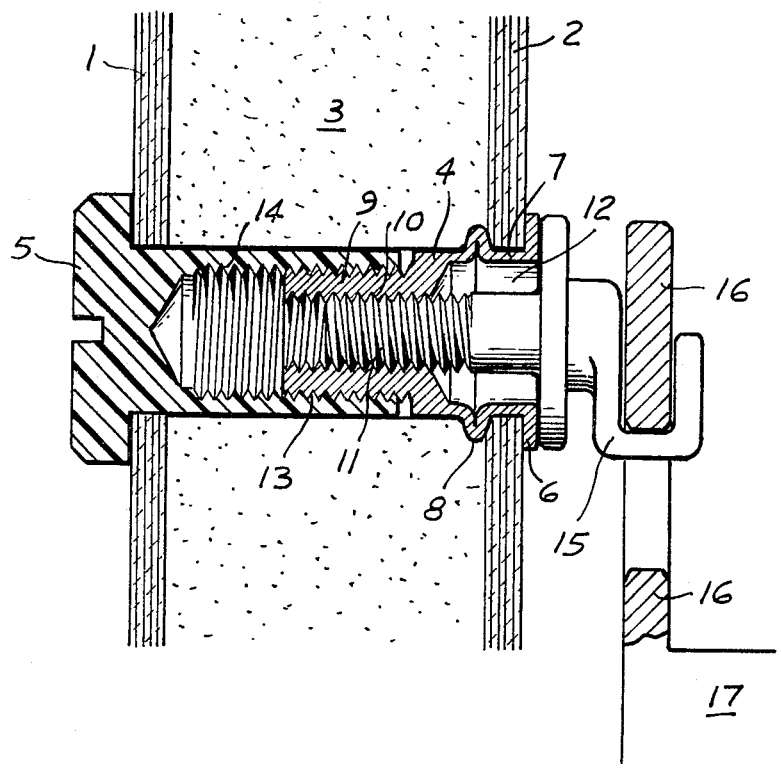
INVENTOR.
GUSTAF SIXTEN ERIKSSON
BY Hane and Baxley
ATTORNEYS United States Patent Office 3,512,328
Patented May 19, 1970

3,512,328
FASTENING DEVICE
Gustaf Sixten Eriksson, 37 Vastra Drottningvagen, 52200 Tidaholm, Sweden, assignor to Bofors-Tidaholmsverken Aktiebolag, Tidaholm, Sweden
Filed July 5, 1968, Ser. No. 742,918
Claims priority, application Sweden, July 7, 1967, 10,368/67
Int. Cl. E04b 2/32
U.S. Cl. 52—617                                    4 Claims

ABSTRACT OF THE DISCLOSURE

A wall anchor for mounting in a through-hole of a sandwich panel having a core sheet covered on both sides by skin sheets of non-weldable material has a headed bolt made of a plastic and including an internally threaded blind axial bore. The length of the shank of the bolt is less than the total thickness of the panel in which the wall anchor is to be mounted. A hollow blind rivet terminating at one end in a head and having a thin cylindrical wall portion adjacent to the head and a set-off heavy walled externally and internally threaded portion is screwed with the threaded portion into the bolt so that the head of the bolt and the head of the rivet abut against the skin sheets. The thin wall portion of the rivet is formed with a peripheral fold which protrudes between the core sheet and the respective skin sheet to clamp this sheet between the fold and the head of the rivet thereby securing the wall anchor in position.

---

The present invention relates to a fastening device, and particularly to a wall anchor intended for fastening in a sheet of a sandwich construction.

Sandwich or laminated elements are currently arousing increasing interest, among other things for use in flat panels. These sandwich elements are often built up of two outer skin sheets consisting of e.g. glass-fibre-reinforced plastic and a spacing element which can consist of a foam platsic or of wood or similar material. The spacing element then as a rule is primarily intended to give rigidity to the construction, but is also often intended to give the element satisfactory insulation. With sheets of this kind, it has been found to pose a problem to be able to make appropriate fastening devices. For this purpose, screw connections have previously been used, such as expanding plastic plugs, washers, screws with split nuts, blind rivet nuts and rubber plugs, as well as rivet joints consisting of e.g. pop rivets or fly rivets. According to the above-mentioned examples, the fastening device will only grip one shell, and it has also been found that, when it is a question of a heavy load, it can only be used if the shell is made of a material that will withstand a high pressure on the edges of the holes made. An example of a material that withstands such high pressures at the edges of the hole is plate, which was previously often used, but now that the outer skin sheets are often made of glass-fibre-reinforced plastic, the above-mentioned fastening devices have been found to be unsuitable. Fastening devices consisting of, for instance, metal bolts passing through both sheets have, of course, previously been used, but such devices are unsuitable when the sandwich construction is used in order to achieve heat insulation, as such through-going metal bolts will form so-called cold-bridges, which create so-called cold points, which lead to condensation and corrosion troubles.

Another method of achieving fastening devices with sufficient strength is, of course, to provide the sandwich element with inserts of e.g. wood or metal, but in such cases it is necessary to know in advance exactly where in the sandwich element the fastening device is to be applied.

The present invention has made it possible to eliminate the above-mentioned disadvantages and to achieve a fastening device that can be used also in cases when the outer skin sheets are made of a material with a low E module, and which only permit relatively limited pressure in the edges of holes, and still obtain very good strength in the fastening device without its acting as a cold-bridge.

The fastening device according to the present invention also has the advantage that it can be applied at any place whatsoever in the sandwich element, without, as previously, special inserts of e.g. wood or metal having been arranged.

The fastening device which is intended for fastening in a sheet of sandwich construction is characterized according to the present invention in that it consists of a blind rivet nut, the external dimensions of which are essentially larger in relation to the diameter of the screw to be inserted than is normal, and at its inner end is provided with external threads, as well as of a plastic screw which has the same external diameter as the blind rivet nut and which is provided with internal threads made to coact with the external threads of the blind rivet nut. The external diameter of the blind nut can appropriately be approximately twice as large as the diameter of the screw to be inserted.

The invention will now be described in more detail with reference to an embodiment shown in the attached figure.

The fastening device shown in the figure is arranged in a sheet having a sandwich or laminated construction, where the outer skins or sheets 1 and 2 consist of glass-fibre-reinforced polyester, and the spacing element or core material 3 consists of polyurethane foam. The fastening device consists of the blind rivet nut 4 and the plastic screw 5. The blind rivet nut 4 can be made of e.g. steel, aluminum or brass, and the plastic screw 5 of an appropriate thermoplastic material with satisfactory heat-insulating properties, and as examples of this can be mentioned nylon 66, Delrin M90 and ABS. The blind rivet nut 4 comprises a ring-shaped head 6 and a cylindrical part 7 arranged in connection with this and made of relatively thin material, which in an entirely conventional manner for blind rivet nuts has been given an upset part 8 on the inside of the polyester sheet 2. Further, the blind rivet nut has in a conventional way a cylindrical part 9 provided with internal threads 10 in which the screw 11 which is to be inserted, fits. Contrary to the case of conventional blind rivet nuts (e.g. the type marketed under the trademark Rivti, sold by the United Shoe Machinery Company AB, Orebro) the blind rivet nut has in part an external diameter which is essentially larger in relation to the diameter of the screw 11 to be inserted than required by the thickness of the material in the cylindrical rivet part 7. As a result, there will be an annular space 12 between the upset cylindrical part 7 and the screw 11 which is to be inserted. Tests have shown that this embodiment does not involve any disadvantages as regards the riveting pressure, in spite of the comparatively great amount of material in relation to the diameter of the riveting tool. This space 12 can possibly be filled in order to further increase the stability of the joint, which, for instance, can be done by providing the screw 11 with a sleeve, but even without such a filling of the space 12, the fastening device according to the present invention has been found to have extremely good strength properties.

At its inner end (i.e. the end which at the insertion will be farthest away from the upset portion 8) the blind rivet nut 4 has external threads 13. The plastic screw 5 is provided with internal threads 14 corresponding to the external threads 13 of the blind rivet nut. Further, the plastic screw 5 has the same outer diameter as the bilnd river nut 4, at part 7, which involves that before inserting the fastening device, only one hole, of uniform size, need be made in the sandwich element.

The screw 11 to be inserted can, as shown in the figure, be provided with a hook 15 which via the lug 16 supports the load 17 indicated in the figure.

Tests made have shown that the external diameter of the blind rivet nut 4 is appropriately made approximately twice as large as the diameter of the screw to be inserted. Thus, if the threads of the screw to be inserted are M5 (diameter 5 mm.) the external diameter of the blind rivet nut should consequently be approx. 10 mm. This is directly contrary to the case of conventional blind rivet nuts, which for M5 threads usually have an external diameter of only 7 mm.

What is claimed is:
1. An assemblage comprising in combination:
   a sandwich panel composed of a core sheet and outer skin sheets of non-weldable material bonded to the core sheet, said panel having a mounting hole therethrough; and
   a wall anchor including:
   a headed bolt made of plastic material and having an internally threaded blind axial bore, said bolt extending into the panel hole from one side thereof with the head of the bolt abutting against the outside of the respective skin sheet and the shank of the bolt terminating short of the other skin sheet;
   a hollow blind rivet terminating at one end in a head, the shank of the rivet adjacent to the head thereof having a cylindrical smooth portion with an outer diameter substantially equal to the outer diameter of the bolt and an internally and externally threaded portion, said rivet extending into the panel hole from the other side thereof with the threaded shank portion of the rivet screwed into the bolt bore to a depth at which the head of the rivet abuts against the outside of the other skin sheet, said smooth portion of the rivet including a circumferential fold protruding between the core sheet and said other skin sheet abutting against the inner side thereof for locking the anchor in its axial position in the panel; and
   a support member having a threaded portion screwable into the inner thread of the rivet.
2. The assemblage according to claim 1 wherein the external diameter of the threaded portion of said support member is about half the outer diameter of the smooth portion of the rivet.
3. A wall anchor for mounting in a through-hole of a sandwich panel having a core sheet covered on both sides by skin sheets of non-weldable material, said wall anchor comprising in combination:
   a headed bolt made of plastic material and having an internally threaded blind axial bore, the shand length of the bolt being less than the combined thickness of the core sheet and one of the skin sheets of the panel;
   a hollow blind rivet terminating at one end in a head, said rivet having a thin walled cylindrical portion adjacent to said head and a set-off heavy walled externally and internally threaded portion, said thin walled portion having an outer diameter substantially equal to the outer diametr of said bolt, the depth of the bore in the bolt and the length of the threaded portion of the rivet being so correlated that the bolt and the rivet are screwable into a position in which the bolt head and the rivet head abut against the outsides of the skin sheets.
4. The wall anchor according to claim 3 wherein the inner side of the bolt head and the inner side of the rivet head are plane for flat engagement with the skin sheets of the panel.

References Cited

UNITED STATES PATENTS

| 2,140,709 | 12/1938 | Mauser | 52—617 |
| 2,341,598 | 2/1944 | Crowley | 85—71 |
| 3,085,463 | 4/1963 | Hallock | 85—70 |
| 3,197,854 | 8/1965 | Rohe et al. | 85—69 |
| 3,356,401 | 12/1967 | Bertram | 85—35 |

FOREIGN PATENTS

| 462,506 | 1/1950 | Canada. |
| 1,254,770 | 1/1961 | France. |

MARION PARSONS, JR., Primary Examiner

U.S. Cl. X.R.

52—708; 85—4, 35, 70; 151—41.72